United States Patent Office 3,527,243
Patented Sept. 8, 1970

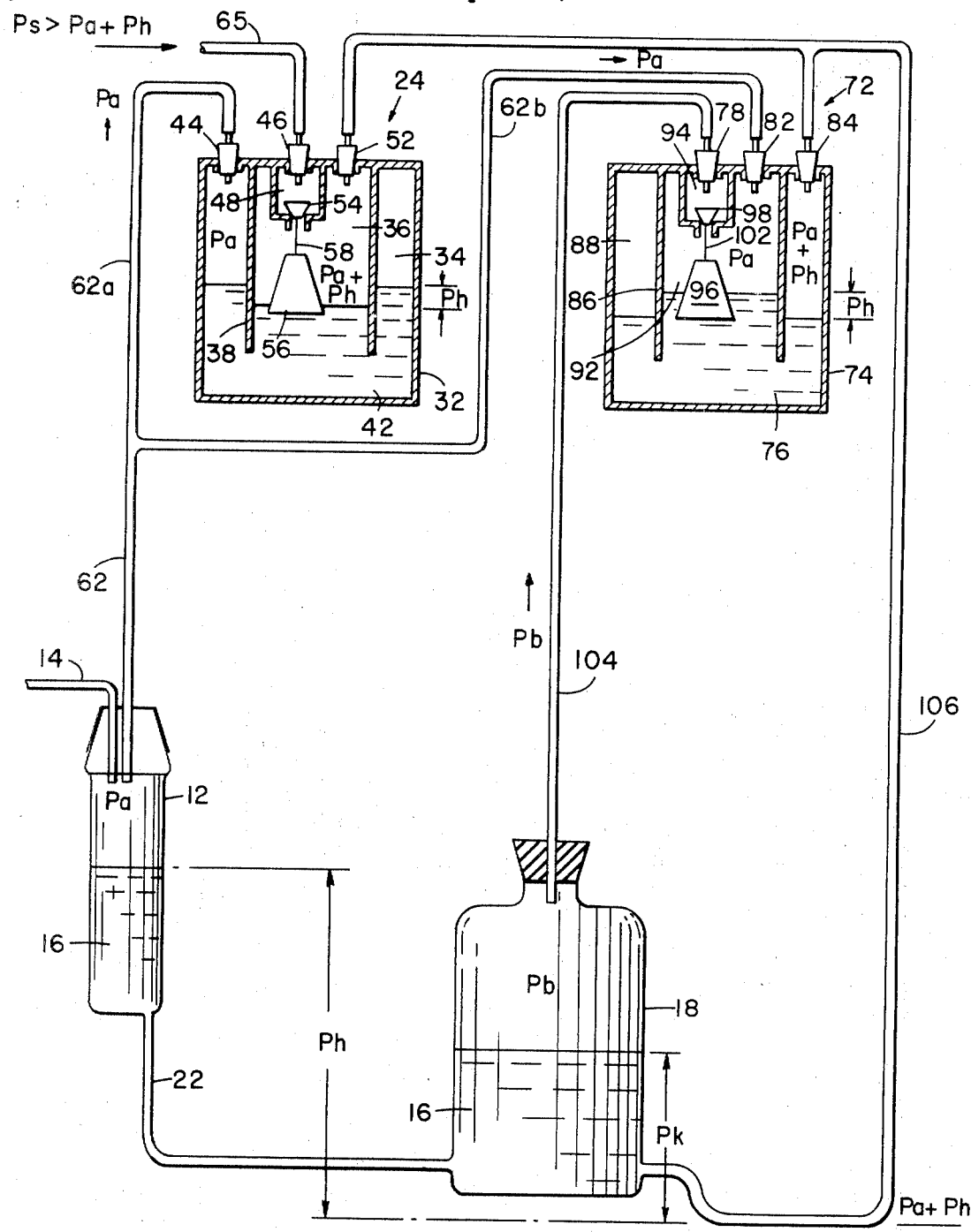

3,527,243
LIQUID LEVEL CONTROL
Mordechai Montag, Plainview, N.Y., assignor to the United States of America as represented by the United States Atomic Energy Commission
Filed Apr. 15, 1969, Ser. No. 816,238
Int. Cl. B67d 5/54
U.S. Cl. 137—209                                         4 Claims

ABSTRACT OF THE DISCLOSURE

A liquid level control system for maintaining automatically the level of a liquid in a container. A pair of regulator functions maintain the level. One function provides for addition of liquid and the other for removal. The system relies on balancing liquid pressures and gaseous pressures above the liquids in the container and a reservoir.

BACKGROUND OF THE INVENTION

The invention described herein was made in the course of, or under a contract with the United States Atomic Energy Commission.

In a liquid control system, such as for example in a system designed to maintain neon gas saturated with alcohol at 0° C., a supply container of the liquid for the system is required wherein it is important to maintain the level of the liquid in the container at a predetermined value or range of values. Presently complex and expensive level detecting devices and make-up arrangements are available and are in use. Aside from the cost of these systems, they are subject to reliability limitations, maintenance problems, and in many cases quite complex calibration problems where instrumentation is involved.

SUMMARY OF THE INVENTION

The present invention overcomes the problems of prior liquid level control systems by providing a unique automatic arrangement for maintaining the liquid within the supply container at the desired level at all times. Appropriate self-operating regulators add or withdraw the liquid in the container as required.

The objects and advantages of this invention will hereinafter become obvious from the following description of a preferred embodiment of this invention taken with reference to the accompanying drawing.

BRIEF DESCRIPTION OF THE DRAWING

The figure illustrates a schematic arrangement embodying the principles of this invention.

DESCRIPTION OF THE PREFERRED EMBODIMENT

Referring to the figure, container 12 which may be open or closed through tubing 14 contains a liquid 16 which may be alcohol whose level is to be controlled or maintained at the value shown, or within a specific range of such value. A typical application is that of maintaining neon filling the space above liquid 16 saturated at all times by bubbling the neon through the liquid by way of a tube (not shown). This could result over a period of time the level of alcohol 16 moving either up or down.

Make-up for container 12 is from a larger reservoir 18 containing a suppy of alcohol 16. A tube 22 interconnects the bottoms of containers 12 and 18. For reasons to be later explained, container 12 is situated such that the upper level of the liquid therein is always above the upper level of the liquid within reservoir 18. A regulator 24 which functions when the level within container 12 drops (pressure $P_a$ above liquid rises) is covered by my U.S. Patent application Ser. No. 616,431, filed Feb. 13, 1967, now Pat. No. 3,421,543. Regulator 24 consists of a fully enclosed housing 32 containing an outer, annular chamber 34 and an inner chamber 36 formed by a cylindrical tube 38 extending down from the top of housing 32 as shown. Housing 32 is filled partially with a suitable control liquid 42, such as mercury, heavier than that of liquid 16.

The top of housing 32 is provided with tubular fittings 44 in the outer chamber end, 46 in auxiliary formed chamber 48 in inner chamber 36, and 52 in inner chamber 36. Auxiliary chamber 48 is closed off at the bottom by a stopper 54 forming a valve.

Within inner chamber 36 is a float 56 from which extends an arm 58 attached to stopper 54. As float 56 rises, arm 58 will raise stopper 54 and thereby open communication into chamber 48. When the level of liquid 42 in inner chamber 36 is low, or drops, stopper 54 will close the opening and float 56 will be supported by stopper 54. A pressure sensing tube 62 extending into container 12 is connected by way of tube 62a through tubular fitting 44 into outer chamber 34 of regulator 24. A tube 65 extends from tubular fitting 46 and chamber 48 to a suitable source of pressure (not shown) designated $P_s$, which is greater than $P_a+P_h$.

A second regulator 72, similar to that of regulator 24, functions when the level of liquid 16 in container 12 rises (pressure $P_a$ above liquid decreases). Regulator 72 consists of housing 74 containing heavy liquid 76, tubular fittings 78, 82, and 84, cylinder 86 forming outer chamber 88 and inner chamber 92, and auxiliary chamber 94. Float 96 is connected to stopper 98 in auxiliary chamber 94 by way of an arm 102.

Tube 62b is connected from fitting 82 in inner chamber 92 to tube 62 into container 12, while a tube 104 transfers pressure above liquid 16 in reservoir 18 to auxiliary chamber 94. A tube 106 extending down from the bottom of reservoir 18 is connected into annular chamber 88 of regulator 72 and inner chamber 36 of regulator 24.

In the operation of apparatus just described, the purpose of the arrangement is to maintain the level of liquid in container 12 at the level shown. Reservoir 18 supplies make-up and, when the level in container 12 lowers, serves as a sink for excess liquid. It will be seen that initially the pressure within annular chamber 34 in regulator 24 is $P_a$ from the pressure above liquid 16 in container 12 and that the pressure within inner chamber 36 is equal to $P_a+P_h$ as pressure $P_s$ will increase the pressure to the point where valve 54 will close by float 56 dropping with the liquid level therein. Thus the difference in heads in regulator 24 as shown in $P_h$. In a similar fashion the pressure within annular chamber 88 of regulator 72 will be $P_a+P_h$ while within inner chamber 92 it will be $P_a$.

When pressure $P_a$ rises causing the level of liquid 16 to drop in container 12, float 56 in regulator 24 will rise causing valve 54 to open and exposing inner chamber 36 to the higher pressure $P_s$. This higher pressure is transferred by way of tube 106 to reservoir 18 which causes additional liquid to be pumped into container 12.

When pressure $P_a$ within vessel 12 drops causing a rise of liquid level within container 12, this is reflected in a drop of pressure in inner chamber 92 of regulator 72. Float 96 rises, opening valve 98 causing inner chamber 92 to be exposed to pressure $P_b$ from reservoir 18 by way of tube 104. $P_b$ exceeds $P_a$ and thereby increases the pressures within both the inner chamber 92 of regulator 72 and pressure $P_a$ within container 12. It will be seen that the system is continuously self-adjusted in accordance with the following relationship:

(1)     $P_a + P_h = P_b + P_k$

It is thus seen there has been provided a simple and reliable system for maintaining automatically the level of a liquid in a container. While the system is especially useful with a closed container the system can be also used with open containers. Although only a preferred embodiment of the invention has been described, it is understood that many variations thereof are possible without departing from the principles of this invention as defined in the following claims.

What is claimed is:

1. A control system for maintaining the level of a liquid within a container, comprising:
   (a) reservoir means containing said liquid for providing make-up to said container and for receiving excess liquid therefrom, the pressure above the liquid therein being $Pb$;
   (b) tube means to transfer liquid between said container and said reservoir means;
   (c) said container being disposed relative to said reservoir means so that the level of liquid in said container is higher than the level in said reservoir means, the total pressure head measured from a point below said reservoir means being $Pa+Ph$, where $Pa$ is the gaseous pressure above the level of liquid within said container and $ph$ is the pressure head due to the liquid therein, the pressure head of the liquid within said reservoir means being $Pk$ at said point;
   (d) first regulator means having first and second chambers, and means for balancing pressures between the aforesaid chambers, the first chamber being exposed to the pressure $Pa$ within said container above the liquid contained therein, and the second chamber being exposed to the total pressure head $Pa+Ph$;
   (e) said first regulator means having valve means for exposing said reservoir means through said second chamber to a source of pressure $Ps$ exceeding the aforesaid total pressure head $Pa+Ph$ upon increase in pressure $Pa$ and declining level in said container for causing liquid from said reservoir means to be pumped into said container; and
   (f) second regulator means for responding to a decrease in pressure $Pa$ and rise in level of liquid within said container to permit liquid from said container to empty into said reservoir means, whereby said control system automatically maintains the relationship $Pa+Ph=Pb+Pk$.

2. The control system of claim 1 in which said second regulator means has first and second chambers and means for balancing pressures between the aforesaid chambers, the first chamber being exposed to the second chamber of said first regulator means, and the second chamber being exposed to the first chamber of said first regulator means, and valve means for exposing the second chamber of said second regulator means to the pressure $Pb$ above the liquid in said reservoir means upon a decrease in pressure $Pa$ and rising liquid level in said container for permitting liquid from said container to pass into said reservoir means.

3. The control system of claim 2 in which all the chambers in both said regulator means contain liquids for balancing pressures between adjacent chambers and each of said valve means is float controlled.

4. The control system of claim 3 in which the liquids in said first and second regulator means are substantially more dense than the liquid in said container and reservoir means.

References Cited
UNITED STATES PATENTS

| | | | |
|---|---|---|---|
| 2,645,906 | 7/1953 | Ryan | 137—209 XR |
| 2,901,040 | 8/1959 | Gade | 137—209 XR |

ROBERT G. NILSON, Primary Examiner

U.S. Cl. X.R.

137—386